Jan. 22, 1946.   E. ORSHANSKY, JR   2,393,558
PRESSURE APPARATUS
Filed Sept. 23, 1942   2 Sheets-Sheet 1

INVENTOR.
Elias Orshansky, Jr.
BY
ATTORNEYS

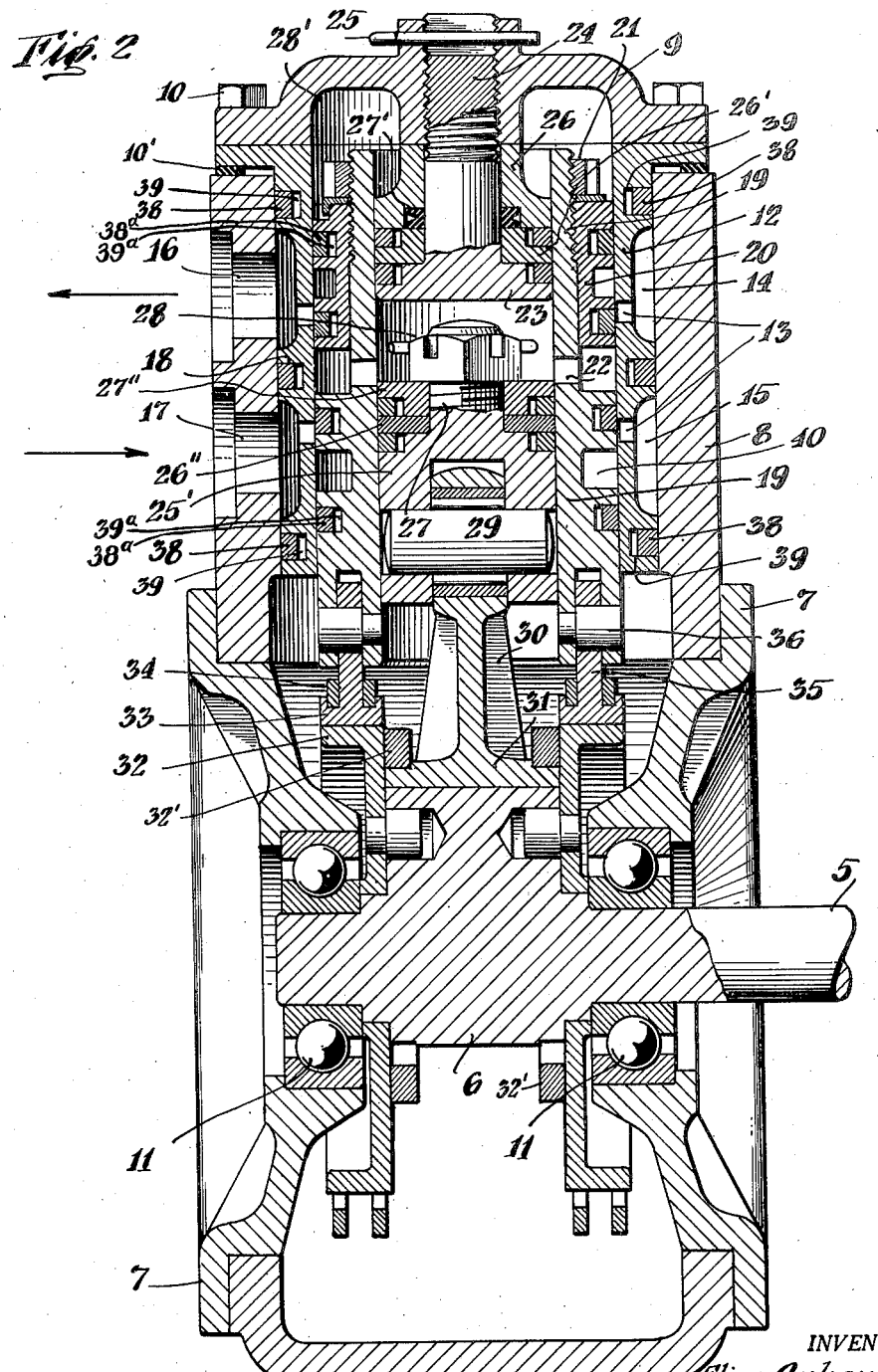

Patented Jan. 22, 1946

2,393,558

UNITED STATES PATENT OFFICE 2,393,558

PRESSURE APPARATUS

Elias Orshansky, Jr., Darien, Conn., assignor to The Aerotorque Company, Cleveland, Ohio, a corporation of Connecticut Application September 23, 1942, Serial No. 459,389

19 Claims. (Cl. 103—163)

This invention relates to a structurally and functionally improved pressure apparatus and, in its more specific aspects, aims to provide units of this nature employable as either hydraulic pumps or motors such as will be useful in connection with the generation of pressure or the production of power drives in aircraft and in other installations where units of this type might be advantageously employed.

It is an object of the invention to furnish apparatus of this nature in which lapped fits may be dispensed with. This will be true both with respect to the pistons as well as the valves of the apparatus. Accordingly, units constructed in accordance with the teachings of the present invention may be produced relatively economically and in large quantities with minimum expenditure of effort and time.

Despite these advantages, however, the apparatus will be capable of generating or operating under high pressures with leakage comparatively less than that which would occur had lapped fits been resorted to. In fact, in many respects, the present units are intended to operate in connection with pressure which may be far in excess of ordinary values, such operation occurring under high efficiency.

An additional object is that of furnishing a pressure apparatus which will function with entire dependability under wide variations of temperature. For example, if employed in an airplane and at high altitudes, temperatures of −70° F. may be encountered, while in the same installation under different conditions temperatures in excess of +130° F. may be met.

With these and other objects in mind, reference is had to the attached sheets of drawings illustrating one practical embodiment of the invention, in which:

Fig. 2 is a somewhat enlarged transverse sectional view taken along the lines 2—2 and in the direction of the arrows as indicated in Fig. 1.

Figure 1:
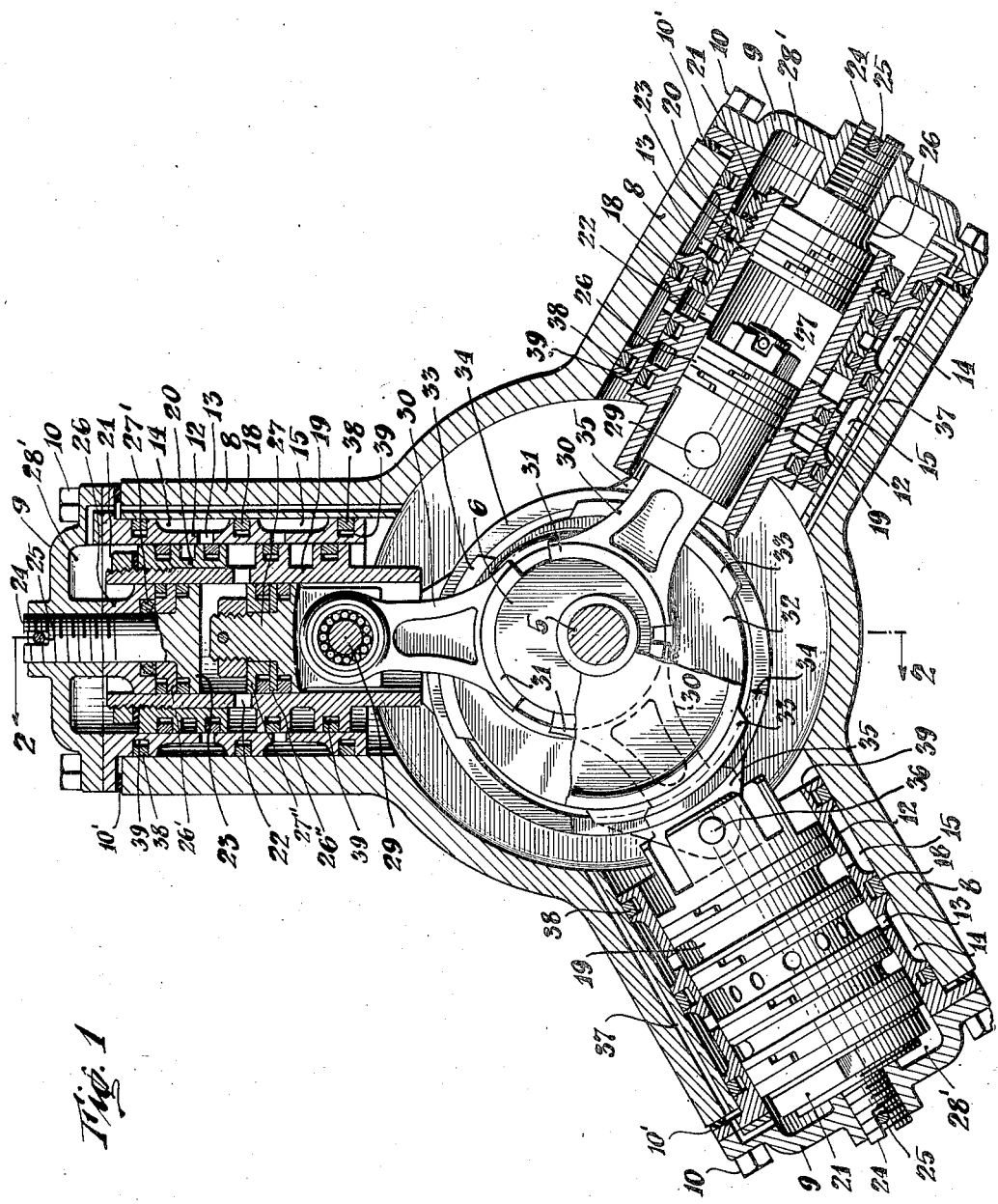
Fig. 1 is a sectional side view of the pressure apparatus.

As previously brought out, the present invention is primarily intended for use in connection with liquids and may be employed to subject such liquid to pressure or to be operated as a motor to be driven by liquid pressure. It is to be understood that the teachings of the present invention are not necessarily limited to the art of hydraulics and might, in fact, be employed in connection with any fluid.

However, considering merely hydraulic pumps and motors, it is well appreciated that considerable difficulty has heretofore been experienced in connection with units of this nature, and especially where they have been employed in apparatus, such as power-transmissions. It has been found necessary, in order to provide an efficient and properly operating apparatus, to specify tolerances such as have not permitted of rapid and economical quantity production of the apparatus. Moreover, it has not been feasible, as a consequence of these close tolerances, to provide for interchangeability of the parts. Additionally, the apparatus has not functioned irrespective of the viscosity, temperature and pressure of the fluid employed.

It is the intention of the present invention to provide an apparatus which may be manufactured according to quantity production methods, and in which the parts will be interchangeable. Moreover, it is intended that these results may be achieved without any impairment of function or operating characteristics of the apparatus. In fact, apparatus so constructed will function far more efficiently than similar apparatus as heretofore constructed and will, in fact, operate independently of the conditions of viscosity, temperature and pressure of the fluid employed in the apparatus.

Also, as a consequence of the present teachings, a valve structure will be furnished which will be extremely efficient under all conditions of operation and will not be critical as to its timing. Such adjustments in timing as have to be provided for may readily be achieved. The valve will preferably be of the balanced type so that only minimum effort will be required to operate it, and quite independently of the pressures which are employed.

These results may be accomplished in an apparatus embodying my novel design and despite the fact that that apparatus—per unit of power—may weigh far less than conventional units as heretofore furnished. This renders the present apparatus particularly valuable for use in aircraft where all permissible reductions in weight should be resorted to. The unit may, additionally, be perfectly balanced according to my findings, in that the present invention contemplates a structure, such that the several parts may be adjusted with nicety.

Referring to the drawings, it will be seen that the reference numeral 5 indicates a shaft to which a crank in the form of an eccentric 6 may be secured. Enclosing this assembly is a crank case 7 from which an outer shell 3 extends. This shell provides a cylinder, the upper end of which is closed by a head or casing 9. The latter may be secured in position by means of bolts 10.

Both the cylinder 8 and casing 7 may be formed of aluminum, and anti-friction elements 11 may be interposed between the shaft 5 and the crank case in order to rotatably support the former. The connections existing between the crank case and the cylinder, as well as the several sections of the case, have not been shown. Suffice it to say, these may include the usual bolt or other elements, and also gaskets, which have likewise not been shown, may be mounted where necessary and in order to effectively seal the space between adjacent surfaces.

Disposed within the cylinder 8 is a liner 12 preferably formed of steel. This liner provides the inner surface of the cylinder. It is formed with ports 13 which may be arranged in radial series and through which fluid may flow. To the rear of these ports, the liner 12 may be provided with channels 14 and 15 which communicate with openings 16 and 17 formed in the outer cylinder wall 8. Between these channels the liner may provide an abutment 18 so that the passages are isolated from each other.

At this time, it will also be noted that any desired number of shims (one of which has been indicated at 10') may be interposed between the outwardly flanged upper end of the liner 12 and the upper edge of the cylinder 8. As will be observed, the greater the number of these shims or spacing elements, the more the liner will be shifted to a position upwardly—as viewed in Fig. 2—within the crylinder 8. This will permit of an adjustment for timing purposes as will be hereinafter more fully brought out.

In turn disposed within the liner 12, is a valve mechanism (if a sleeve-type valve is employed). This, according to the present invention, is preferably the case. This mechanism may include, as shown, a tubular body 19, the lower portion of which is of a circumference such that it fits loosely within the liner 12 and the upper portion of which is reduced. Mounted upon threads formed in this upper portion is a collar 20. The latter is preferably secured against movement by employing a locking ring or nut 21 threaded to engage the correspondingly threaded portion of the body 19. A port 22, through which fluid may flow from either of the central ports 13, is formed through the body 19. As will be appreciated as a consequence of this construction, the upper portion of the sleeve provided by the collar 20 or its equivalent may be adjusted longitudinally of the sleeve proper. This again, is highly desirable for the purpose of timing the parts, as will be brought out.

At this time, it will be observed that the head or casing 9 mounts the cylinder head proper. This may be in the form of a plunger 23 from which a screw-threaded extension 24 projects. The latter may have engagement with correspondingly shaped threads forming a part of the head 9 and be thus secured against movement with respect to that head. A pin 25 or other locking expedient may be resorted to, to secure these parts against movement once their positions have been properly established. A collar member 26 may encircle the stud or extension 24 and abut against a downwardly extending portion of the head 9. A spacing element 26' may be interposed between portion 26 and the head proper 23. A packing 27' may, in turn, be interposed between this element and the portion 26.

In turn disposed in sleeve 19 and below the head 23 is a piston. This preferably includes a body 25' and spacing elements 26'' and 27''. The latter elements are retained in position by preferably encircling a screw-threaded extension 27 of the body 25'. A nut 28 secures the entire assembly against movement of its several parts with respect to each other. A wrist-pin 29, mounted by body 25', may movably support the upper end of a conecting rod 30. The lower end of this rod terminates in a contact or foot portion 31 which may be in the form of a slipper element. This portion cooperates with the crank or eccentric 6.

Rings 32' encircle the shaft 5 and overlap the edge portions of the slipper elements 31 in order to maintain the latter in contact with the periphery of the eccentric 6. Disposed adjacent rings 32' and mounted upon the eccentric 6 are eccentrics 32. The edges of the latter engage the foot portions 33 of connecting elements which are maintained in these positions by means of retaining rings 34 or in any other desirable manner. The upper ends of the foot portions provide connecting elements 35 pivotally coupled as at 36 to the sleeve or tube 19. In common with the eccentric 6, members 32 are eccentrically disposed with reference to the axis of shaft 5. The timing of the parts is preferably such that the centers of eccentric 6 and members 32 are displaced approximately 90°. Thus, it will be understood as the shaft 5 roates, the valve mechanism will be shifted to permit a flow of fluid through passages 22 and 13. In the event the apparatus is employed as a motor, the connecting rods 30 will drive the eccentric 6 and the shaft 5 and, if employed as a pump, the latter will drive the former and the pistons.

As has been shown in Fig. 1, the unit may include three cylinders. Obviously, a greater or lesser number of cylinders might be incorporated. Assuming that the mechanism is being operated as a pump, it will be appreciated that the shaft 5 will be rotated by any desired source of motive power and this will cause the crank or eccentric 6 to be also rotated. Such rotation will cause the connecting rods 30 to be reciprocated. As afore brought out, these rods are maintained in position adjacent their lower ends by engaging the rings 32' and the eccentric. As the rods move upwardly within the various cylinders, the pistons will similarly move upwardly. The clearance between the heads of the cylinders and the pistons may be adjusted and, therefore, the capacity of the cylinders may be varied. Fluid within the cylinders will thus be subjected to pressure. This fluid will escape from the cylinders through the ports 22 and thence through the ports 13 to the outlet 16. As the top of the piston stroke is reached, the valve mechanism will function to interrupt further flow through the afore mentioned ports by moving the port 22 out of registry with the uppermost port 13. The suction stroke will now be initiated and due to the fact that the eccentricity of the members 32 is timed in the manner afore suggested, it will follow that ports 22 will rapidly align with the lower series of ports 13, so that fluid may flow through the opening or passage 17 towards the cylinder.

Any fluid which is trapped within the space 28' may be vented, for example, through passages 37 back to the crank case. In this manner, the building up of back pressure will be avoided.

Now, as afore brought out, those portions of the present mechanisms which may be manufactured of aluminum or similar light material are produced accordingly. With the wide variation in temperature range to which these mechanisms may be subjected, it is apparent that problems may readily arise incident to the difference in the coefficient of expansion involved between the various materials present in the unit. With this thought in mind, and also as afore brought out, it is preferred that no lapped fit of any of the parts be employed. Instead, however, packing members 38 are utilized. These members may correspond identically with piston rings of one of a number of different and acceptable designs. Such rings are mounted within channels 39. The latter are formed in, for example, the central portion 18 and end portions of the cylinder liner 12. Incident to their expansive tendencies, they will constantly bear in yielding contact against the inner face of the cylinder proper 8.

Further grooves or recesses 39a and rings 38a or their equivalents will be mounted, for example, on the exterior faces of the sleeve 19 and the part 20 of this assembly. Consequently, a proper seal will be furnished between these parts and the inner face of the cylinder liner or wall. Thus, this liner will have only a minimum bearing surface with the sleeve enclosed by the same. This will be true in that the only real engagement between these parts will occur on the exposed faces of the rings. In this connection, it will be noted, that, where feasible, the exterior face of the valve assembly may be reduced or grooved as indicated at 40. This will serve to diminish the area of contact between the relatively movable parts. Also, it will reduce the weight of the unit.

In connection with the rings or packing as thus provided, it will primarily be understood that single rings (as shown) may be employed or that any desired compound structure utilizing any number of rings, might be utilized. Quite irrespective of this, however, it will be understood, especially with reference to the rings which form a part of the sleeve valve, that they, in effect, provide "line-seal," serving completely to isolate the liquid flows within the apparatus. Consequently, no effective leakage of liquid will occur and despite the fact that relatively high pressures are employed. As is also apparent, the tolerances which may exist between, for example, the head and the sleeve, and the sleeve and the liner, may be quite simple and not of a critical nature; the packings or rings serving to prevent any leakage and consequent loss of power.

As will be apparent and especially if rings are employed, no difficulty will be experienced in having these rings yieldingly bear against adjacent surfaces and after they have been snapped into position in the grooves which are to receive them. As may be understood, both the piston and the head 23 may be of relatively small diameter. It is for this reason that assemblies, such as provide these parts, have been resorted to. With reduced diameters, it might not be feasible to provide rings or packings which would snap into grooves and after sliding over the maximum diameter of the body. Therefore, and by a construction such as that illustrated, it is feasible to assemble these parts with the rings in position and so that the latter will embody sufficient resiliency to achieve the desired results.

As has been previously brought out by employing shims 10' or their equivalent, the position of the liner within the cylinder may be adjusted. This will be especially desirable if, upon the assembly of the parts, it appears that these are out of proper "timing." Moreover, in order to permit of proper timing being achieved, it will be understood that the collar portion 20 may be adjusted with reference to the sleeve 19 in order to assure a proper registry and non-registry or communication of passages 22 with passages 13.

As a consequence of the valve, in effect, providing line-seal, it will be understood that the apparatus will function properly and leakage will be substantially precluded irrespective of the viscosity, temperature and pressure of the fluid which is employed. This will be true whether the temperature of the apparatus approaches 250° F. or whether it is subjected to approximately —70° F.; this being the general temperature range of the apparatus under present flying conditions.

As a consequence of the displacement effected with respect to eccentric 6 in comparison with eccentrics 32, it will be appreciated that the piston will be moving at minimum speed when the valves have maximum velocity. Conversely, when the valves are moving at minimum speeds, the pistons will have maximum velocity. This will have the result that, if, due to manufacturing tolerances, a slight error in timing exists, such error will be of no substantial consequence.

In other words, assuming that a valve is 5° off in timing, that is, valve port registration with either the inlet or outlet passage is either ahead or late of what it should be, this will be effective only when the piston is moving at minimum velocity. Consequently, the amount of fluid which is being received or displaced will be very small. At the same time, the valve is moving at maximum velocity, so that the condition will be corrected in the shortest interval of time. When the piston is once moving at a high rate of speed and displacing a maximum volume of fluid or liquid, the valve will be moving at minimum speed. Thus, no difficulties would be experienced in connection with quantity assembly and even if the timing should be slightly incorrect.

As will also be observed, by having the head proper of the cylinder bridge the space within which the valve is operating, the valve may remain balanced. Otherwise stated and with particular reference to Fig. 2, the sleeve valve does not have its upper or lower edge portions subjected to pressures which occur within the interior of the cylinder. Thus, no particular effort or force is required to shift the valve in either direction. Hence, a balanced structure is assured.

Apparatus of this nature may be manufactured, for example, with .003" tolerance. As will be appreciated, this will permit of ready interchangeability of the parts and quantity production. Despite this, however, and as afore brought out, the entire mechanism will hold pressures without the necessity of employing any lapped fit.

Thus, among others, the several objects of the invention as specifically afore noted are achieved. Obviously, numerous changes in construction and rearrangements of the parts might be resorted to without departing from the spirit of the invention as defined by the claims.

I claim:

1. A pressure apparatus including in combination a cylinder formed with an inlet and an outlet passage, a sleeve within said cylinder, said sleeve having a port adapted for connection with said inlet and outlet passages, a piston within said sleeve, said sleeve being formed with grooves, packing rings mounted within said grooves and engaging the adjacent face of said cylinder, means for reciprocating said sleeve within said cylinder, a liner member providing the inner face of said cylinder, said liner member formed with inlet and outlet ports for interconnecting said sleeve port with said cylinder inlet and outlet passages, and packing rings interposed between said liner member and the outer portion of said cylinder.

2. A pressure apparatus including in combination a cylinder formed with an inlet and an outlet passage, a piston reciprocable within said cylinder, a shaft, a crank portion forming a part of said shaft, a connecting rod extending between said piston and said crank portion, a sleeve interposed between said cylinder and piston, said sleeve having a port adapted for connection with said inlet and outlet passages, a cam secured to said crank portion and cooperative with said connecting rod to maintain the latter in association with said portion, a link extending between said sleeve and said cam, and retaining rings overlying said link and maintaining the latter in contact with the cam surface.

3. A pressure apparatus including in combination a cylinder formed with an inlet and an outlet passage, a sleeve valve disposed within said cylinder, said sleeve having a port adapted for connection with said inlet and outlet passages, a piston reciprocable within said sleeve valve, and means connecting said piston and sleeve valve and causing relative movements of the same such that, with said piston moving at maximum velocity, said sleeve valve will move at minimum velocity.

4. A pressure apparatus including in combination a cylinder, a piston reciprocable within said cylinder, said cylinder being formed with inlet and outlet ports, valve mechanism including a reciprocable sleeve for controlling the flow of liquid through said ports, and means connecting said mechanism with said piston whereby, as the latter moves with maximum velocity, said mechanism will move with minimum velocity.

5. A pressure apparatus including in combination a cylinder formed with an inlet and an outlet passage, a sleeve valve reciprocable within said cylinder, said sleeve having a port adapted for registration with said inlet and outlet passages, a piston reciprocable within said sleeve valve, means for connecting said piston to reciprocate said sleeve valve, as said piston moves, and means whereby said valve is substantially free from liquid under pressure acting against its opposite edge portions.

6. A pressure apparatus including in combination a cylinder formed with an inlet and an outlet passage, a sleeve valve reciprocable within said cylinder, said sleeve having a port adapted for connection with said inlet and outlet passages, a piston reciprocable within said sleeve valve, means for connecting said piston to reciprocate said sleeve valve, as said piston moves, and a head portion mounted by said cylinder and bridging said sleeve valve and extending into the same, whereby said valve is substantially free from liquid under pressure acting against its opposite edge portions.

7. A pressure apparatus including in combination a cylinder formed with an inlet and an outlet passage, a sleeve valve reciprocable within said cylinder, said sleeve having a port adapted for connection with said inlet and outlet passages, a piston reciprocable within said sleeve valve, means for connecting said piston to reciprocate said sleeve valve, as said piston moves, a head portion mounted by said cylinder and bridging said sleeve valve, and means extending adjustably with respect to said head portion and into the interior of said sleeve to free the opposite edge portions of said valve from liquid pressure and to vary the capacity of the cylinder provided by the same.

8. A pressure apparatus including in combination a cylinder formed with an inlet and an outlet passage, a piston reciprocable within said cylinder, a sleeve valve interposed between said piston and cylinder and formed with ports adapted for connection with said inlet and outlet passages for the flow of liquid, means causing said sleeve valve to be moved in response to movements of said piston, and packing means mounted by said sleeve valve and providing a "line-seal" such that, said valve will interrupt the flow of liquid from said cylinder and whereby leakage and slippage is substantially prevented irrespective of the viscosity, temperature and pressure of the liquid flowing into and from said cylinder.

9. A pressure apparatus including in combination a cylinder formed with an inlet and an outlet passage, a piston reciprocable within said cylinder, a sleeve valve interposed between said piston and cylinder, said valve being formed with ports adapted for connection with said inlet and outlet passages, means whereby, in response to piston movement, said sleeve valve is moved, and a section of said sleeve valve being adjustable with reference to the remainder of the same whereby effective initiation of flow and interruption of flow of liquid to and from said cylinder may be varied.

10. A pressure apparatus comprising in combination a cylinder formed with an inlet and an outlet passage, a sleeve within said cylinder, said sleeve having a port adapted for connection with said inlet and outlet passages, a piston within said sleeve, first eccentric means for reciprocating said sleeve within said cylinder, and second eccentric means for reciprocating said piston within said sleeve, said first and second eccentric means being coupled together at an angular phase displacement of substantially 90°, whereby as the sleeve is moving with substantially maximum velocity the piston is moving with minimum velocity.

11. A pressure apparatus comprising in combination a cylinder formed with an inlet and an outlet passage, a sleeve within said cylinder, said sleeve having a port adapted for connection with said inlet and outlet passages, a piston within said sleeve, first eccentric means for reciprocating said sleeve within said cylinder, and second eccentric means connected to said first eccentric means for reciprocating said piston within said sleeve, the eccentricities of said first and second eccentric means being disposed at a phase displacement angle of substantially 90°, whereby as the sleeve is moving at substantially minimum velocity the piston is moving at maximum velocity.

12. A pressure apparatus comprising in combination a cylinder formed with an inlet and an outlet passage, a sleeve within said cylinder, said sleeve having a port adapted for registration with said inlet and outlet passages, a piston within said sleeve, a shaft for driving said piston and sleeve, first eccentric means on said shaft for reciprocating said sleeve within said cylinder, and second eccentric means on said shaft for reciprocating said piston within said sleeve, said first eccentric means being coupled to said second eccentric means at an angular phase displacement of 90°, whereby at a predetermined direction of rotation of said shaft the first eccentric means leads said second eccentric means, so that as the sleeve moves substantially at maximum velocity the piston moves substantially at minimum velocity.

13. A pressure apparatus comprising in combination a cylinder formed with an inlet and an outlet passage, a sleeve within said cylinder, said sleeve having a port adapted for connection with said inlet and outlet passages, a piston within said sleeve, eccentric means for reciprocating said sleeve within said cylinder and said piston within said sleeve, and adjustable means for timing registration of said sleeve port with said inlet and outlet passages.

14. A pressure apparatus comprising in combination a cylinder formed with an inlet and an outlet passage, a sleeve within said cylinder, said sleeve having a port adapted for connection with said inlet and outlet passages, a piston within said sleeve, means for reciprocating said sleeve and for reciprocating said piston in a predetermined sequence, and adjustable means on said sleeve for timing registration of said sleeve port with said inlet and outlet passages, whereby the instant of registration of said sleeve port with said outlet passage may be varied.

15. A pressure apparatus comprising in combination a cylinder formed with an inlet and an outlet passage, a sleeve within said cylinder, said sleeve having a port adapted for connection with said inlet and outlet passages, a piston within said sleeve, means for reciprocating said sleeve within said cylinder and for reciprocating said piston within said sleeve in a predetermined sequence, and means for adjusting the opening of said sleeve port, whereby registration of said sleeve port with said inlet and outlet passages may be varied.

16. A pressure apparatus comprising in combination a cylinder formed with an inlet and an outlet passage, a sleeve within said cylinder, said sleeve having a port adapted for connection with said inlet and outlet passages, a piston within said sleeve, means for reciprocating said sleeve within said cylinder and for reciprocating said piston within said sleeve in a predetermined sequence, and means on said sleeve for varying the area of said sleeve port, whereby the instant for registration of said sleeve port with said outlet passage may be changed and whereby the volume of liquid flow through said sleeve port may be changed.

17. A pressure apparatus comprising in combination a cylinder formed with an inlet and an outlet passage, a sleeve within said cylinder, said sleeve having a port adapted for connection with said inlet and outlet passages, a piston within said sleeve, means for reciprocating said sleeve and said piston in a predetermined sequence, a liner member for providing the inner face of said cylinder, said liner member being formed with inlet and outlet ports for interconnecting said sleeve port with said cylinder inlet and outlet passages, respectively, and adjustable means adapted for timing registration of said ports with said inlet and outlet passages, said means comprising an adjustable collar for varying the aperture of said sleeve port, and means for varying the relative position of said liner ports with said sleeve port.

18. A pressure apparatus comprising in combination a cylinder having an inlet and an outlet passage, a sleeve slidably mounted within said cylinder, said sleeve having a port adapted for connection with said inlet and outlet passages, a piston slidably mounted within said sleeve, means for reciprocating said sleeve and said piston in a predetermined sequence with respect to each other, a movable liner member cooperating with said sleeve for providing the inner face of said cylinder, said liner member being formed with inlet and outlet ports for respectively interconnecting said sleeve port with said cylinder inlet and outlet passages, and manually adjustable means adapted for timing registration of said sleeve port with said liner ports and said liner ports with said inlet and outlet passages, said means including an adjustable collar for varying the aperture of said sleeve port, and variable spacing shims for adjusting the relative position of said liner ports and sleeve port.

19. A pressure apparatus comprising in combination a cylinder formed with an inlet and an outlet passage, a sleeve within said cylinder, said sleeve having a port adapted for connection with said inlet and outlet passages, a piston within said sleeve, means for reciprocating said sleeve and said piston in predetermined sequence, a liner member interposed between said cylinder and said sleeve having inlet and outlet ports for interconnecting said sleeve port with said cylinder inlet and outlet passages, respectively, said liner being adjustable for varying the relative position of said liner ports with said sleeve port.

ELIAS ORSHANSKY, Jr.